United States Patent
Tian et al.

(10) Patent No.: US 10,187,813 B2
(45) Date of Patent: Jan. 22, 2019

(54) SYSTEMS AND METHODS FOR IMPROVED PROTECTION MODES IN HIGH-EFFICIENCY WIRELESS NETWORKS

(71) Applicant: QUALCOMM Incorporated, San Diego, CA (US)

(72) Inventors: Bin Tian, San Diego, CA (US); Simone Merlin, Solana Beach, CA (US); Gwendolyn Denise Barriac, Encinitas, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 14/748,051

(22) Filed: Jun. 23, 2015

(65) Prior Publication Data

US 2015/0382216 A1  Dec. 31, 2015

Related U.S. Application Data

(60) Provisional application No. 62/017,094, filed on Jun. 25, 2014.

(51) Int. Cl.
*H04W 24/08* (2009.01)
*H04W 74/08* (2009.01)
*H04B 7/0452* (2017.01)

(52) U.S. Cl.
CPC .......... *H04W 24/08* (2013.01); *H04B 7/0452* (2013.01); *H04W 74/0816* (2013.01)

(58) Field of Classification Search
None
See application file for complete search history.

(56) References Cited

U.S. PATENT DOCUMENTS

| | | | |
|---|---|---|---|
| 2005/0153735 A1* | 7/2005 | Morioka | H04L 47/10 455/553.1 |
| 2012/0026928 A1 | 2/2012 | Gong et al. | |
| 2013/0286959 A1 | 10/2013 | Lou et al. | |
| 2013/0301551 A1* | 11/2013 | Ghosh | H04W 72/042 370/329 |

OTHER PUBLICATIONS

International Search Report and Written Opinion—PCT/US2015/037418—ISA/EPO—dated Oct. 2, 2015.

(Continued)

*Primary Examiner* — Charles C Jiang
*Assistant Examiner* — Saad Khawar
(74) *Attorney, Agent, or Firm* — Knobbe, Martens, Olson & Bear, LLP

(57) ABSTRACT

Methods and apparatus for adjusting transmission power in wireless networks are provided. One aspect of the disclosure provides an apparatus for wireless communication. The apparatus includes a processing system configured to receive a message instructing each of multiple devices to transmit a packet at least partially concurrently with each transmission of the other multiple devices. The processing system is further configured to generate the packet. The packet includes an indicator having a value greater than a time associated with a transmission of the packet. An interface is configured to provide the packet for transmission.

24 Claims, 9 Drawing Sheets

(56) References Cited

OTHER PUBLICATIONS

"IEEE Standard for Information technology—Telecommunications and information exchange between systems Local and metropolitan area networks—Specific requirements Part 11: Wireless LAN Medium Access Control (MAC) and Physical Layer (PHY) Specifications; IEEE Std 802. Nov. 2012 (Revision of IEEE Std 802.1", IEEE STD 802. Nov. 2012, IEEE Computer Society, New York, USA, Mar. 29, 2012 (Mar. 29, 2012), pp. 1-2793, XP017694963, ISBN: 978-0-7381-7211-8.

* cited by examiner

SYSTEMS AND METHODS FOR IMPROVED PROTECTION MODES IN HIGH-EFFICIENCY WIRELESS NETWORKS

CROSS-REFERENCE TO RELATED APPLICATIONS

This application claims priority under 35 U.S.C. § 119(e) to U.S. Provisional App. No. 62/017,094, filed Jun. 25, 2014, which is incorporated by reference herein in its entirety.

FIELD

Certain aspects of the present disclosure generally relate to wireless communications, and more particularly, to methods and apparatus for protecting wireless communications in high-efficiency wireless networks.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

The devices in a wireless network can transmit/receive information between each other. Device transmissions can interfere with each other, and certain transmissions can selectively block other transmissions. Where many devices share a communication network, congestion and inefficient link usage can result. As such, systems, methods, and non-transitory computer-readable media are needed for improving communication efficiency in high efficiency wireless networks.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures might not be drawn to scale.

One aspect of the disclosure provides an apparatus for wireless communication. The apparatus includes a processing system configured to receive a message instructing each of multiple devices to transmit a packet at least partially concurrently with each transmission of the other multiple devices. The processing system is further configured to generate the packet. The packet includes an indicator having a value greater than a time associated with a transmission of the packet. An interface is configured to provide the packet for transmission.

In various aspects, the processing system can be configured to receive an acknowledgement regarding reception of the packet during a time indicated in the indicator. The indicator has a value greater than the time associated with the transmission of the packet by at least a transmission time of the acknowledgement. In various aspects, the time associated with the transmission of the packet can be a time duration of the packet.

In various aspects, the message instructing each of the multiple devices to transmit the packet can include a clear-to-send frame including an identifier of the apparatus. In various aspects, the message instructing each of the multiple devices to transmit the packet can include an indication of a time period. The value of the indicator can be based on the indication of the time period. In various aspects, the time period can indicate a time associated with transmission of an acknowledgment.

In various aspects, the message instructing each of the multiple devices to transmit the packet can include a packet transmission time instruction. The processing system can be configured to generate the packet during a time duration indicated by the packet transmission time instruction.

In various aspects, the packet can include a multiple-in-multiple-out frame or an orthogonal frequency division multiple access frame. In various aspects, the packet can include a single-user portion including the indicator. The single-user portion can be compatible with an 802.11a or 802.11b preamble format. In various aspects, the packet can include a multi-user portion without an indication of packet transmission time.

In various aspects, the packet can include a portion identical to a packet transmitted by one of the multiple devices. The portion can include the indicator.

Another aspect provides a method of wireless communication. The method includes receiving, at a wireless device, a message instructing each of multiple devices to transmit a packet at least partially concurrently with each transmission of the other multiple devices. The method further includes generating the packet. The packet includes an indicator. The indicator has a value greater than a time associated with a transmission of the packet. The method further includes providing the packet for transmission.

In various aspects, the method can further include receiving an acknowledgement regarding reception of the packet during a time indicated in the indicator. The indicator can have a value greater than the time associated with the transmission of the packet by at least a transmission time of the acknowledgement. In various aspects, the time associated with the transmission of the packet can be a time duration of the packet.

In various aspects, the message instructing each of the multiple devices to transmit the packet can include a clear-to-send frame including an identifier of the wireless device. In various aspects, the message instructing each of the multiple devices to transmit the packet can include an indication of a time period. The value of the indicator can be based on the indication of the time period. In various aspects, the time period can indicate a time associated with transmission of an acknowledgment.

In various aspects, the message instructing each of the multiple devices to transmit the packet can include a packet transmission time instruction. The method can further include providing the packet for transmission during a time duration indicated by the packet transmission time instruction.

In various aspects, the packet can include a multiple-in-multiple-out frame or an orthogonal frequency division multiple access frame. In various aspects, the packet can include a single-user portion including the indicator. The single-user portion can be compatible with an 802.11a or 802.11b preamble format. In various aspects, the packet can include a multi-user portion without an indication of packet transmission time.

In various aspects, the packet can include a portion identical to a packet transmitted by one of the multiple devices. The portion can include the indicator.

Another aspect provides an apparatus for wireless communication. The apparatus includes means for receiving a message instructing each of multiple devices to transmit a packet at least partially concurrently with each transmission of the other multiple devices. The apparatus further includes means for generating the packet. The packet includes an indicator. The indicator has a value greater than a time associated with a transmission of the packet. The apparatus further includes means for providing the packet for transmission.

In various aspects, the apparatus can further include means for receiving an acknowledgement regarding reception of the packet during a time indicated in the indicator. The indicator can have a value greater than the time associated with the transmission of the packet by at least a transmission time of the acknowledgement. In various aspects, the time associated with the transmission of the packet can be a time duration of the packet.

In various aspects, the message instructing each of the multiple devices to transmit the packet can include a clear-to-send frame including an identifier of the apparatus. In various aspects, the message instructing each of the multiple devices to transmit the packet can include an indication of a time period. The value of the indicator can be based on the indication of the time period. In various aspects, the time period can indicate a time associated with transmission of an acknowledgment.

In various aspects, the message instructing each of the multiple devices to transmit the packet can include a packet transmission time instruction. The apparatus can further include means for providing the packet for transmission during a time duration indicated by the packet transmission time instruction.

In various aspects, the packet can include a multiple-in-multiple-out frame or an orthogonal frequency division multiple access frame. In various aspects, the packet can include a single-user portion including the indicator. The single-user portion can be compatible with an 802.11a or 802.11b preamble format. In various aspects, the packet can include a multi-user portion without an indication of packet transmission time.

In various aspects, the packet can include a portion identical to a packet transmitted by one of the multiple devices. The portion can include the indicator.

Another aspect provides a computer program product including a computer readable medium encoded thereon with instructions that when executed cause an apparatus to perform a method of wireless communication. The method includes receiving a message instructing each of multiple devices to transmit a packet at least partially concurrently with each transmission of the other multiple devices. The method further includes generating the packet. The packet includes an indicator. The indicator has a value greater than a time associated with a transmission of the packet. The method further includes providing the packet for transmission.

In various aspects, the method can further include receiving an acknowledgement regarding reception of the packet during a time indicated in the indicator, the value being greater than the time associated with the transmission of the packet by at least a transmission time of the acknowledgement. In various aspects, the time associated with the transmission of the packet can be a time duration of the packet.

In various aspects, the message instructing each of the multiple devices to transmit the packet can include a clear-to-send frame including an identifier of the apparatus. In various aspects, the message instructing each of the multiple devices to transmit the packet can include an indication of a time period. The value of the indicator can be based on the indication of the time period. In various aspects, the time period can indicate a time associated with transmission of an acknowledgment.

In various aspects, the message instructing each of the multiple devices to transmit the packet can include a packet transmission time instruction. The method can further include providing the packet for transmission during a time duration indicated by the packet transmission time instruction.

In various aspects, the packet can include a multiple-in-multiple-out frame or an orthogonal frequency division multiple access frame. In various aspects, the packet can include a single-user portion including the indicator. The single-user portion can be compatible with an 802.11a or 802.11b preamble format. In various aspects, the packet can include a multi-user portion without an indication of packet transmission time.

In various aspects, the packet can include a portion identical to a packet transmitted by one of the multiple devices. The portion can include the indicator.

Another aspect provides a wireless node for wireless communication. The wireless node includes an antenna. The wireless node further includes a processing system configured to receive a message instructing each of multiple devices to transmit a packet at least partially concurrently with each transmission of the other multiple devices. The processing system is further configured to generate the packet. The packet includes an indicator. The indicator has a value greater than a time associated with a transmission of the packet. An interface is further configured to provide the packet for transmission via the antenna

DETAILED DESCRIPTION

Figure 1:
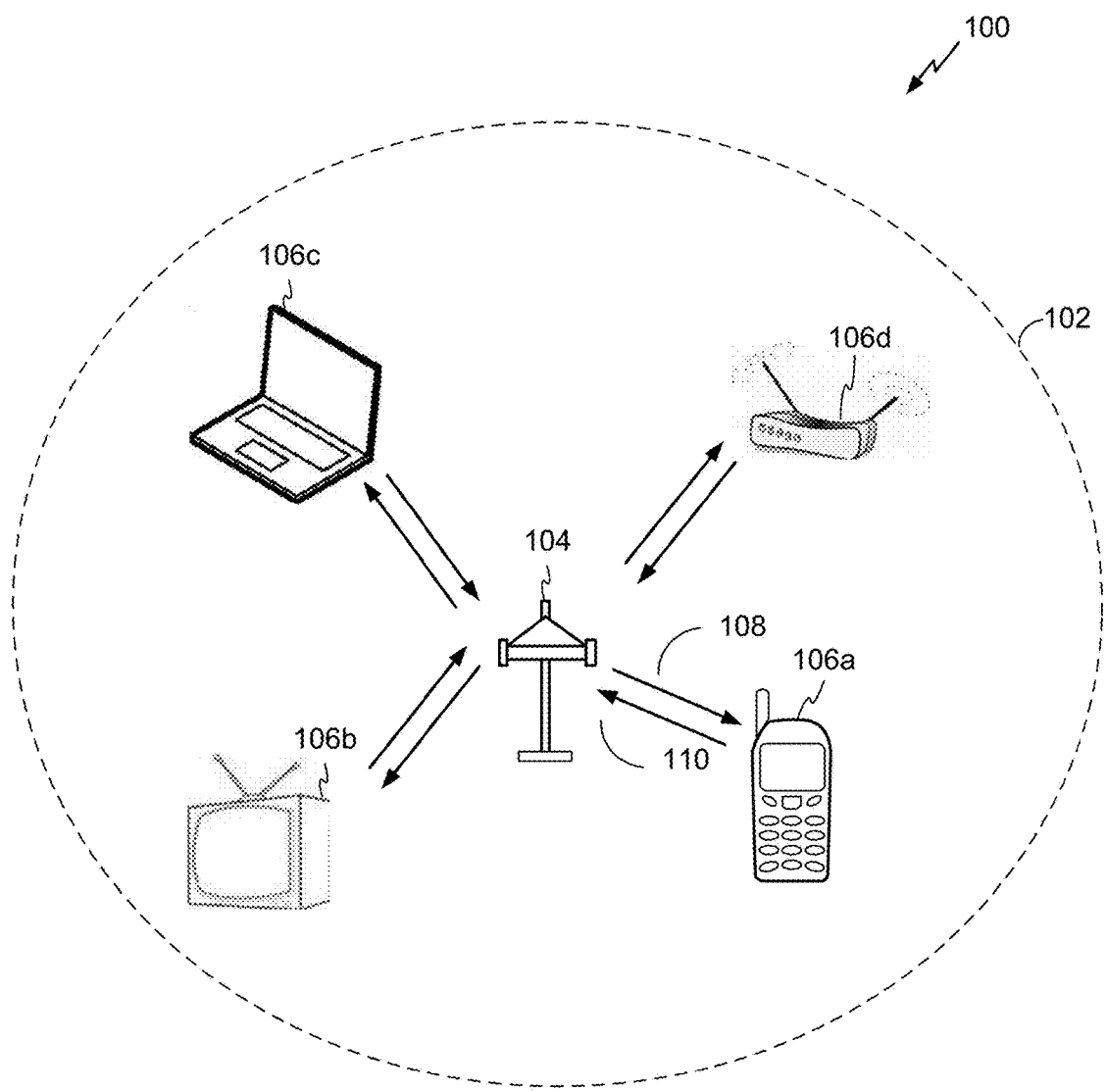
FIG. 1 illustrates an example of a wireless communication system in which aspects of the present disclosure can be employed.

Various aspects of the novel systems, apparatuses, and methods are described more fully hereinafter with reference to the accompanying drawings. The teachings disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies can include various types of wireless local area networks (WLANs). A WLAN can be used to interconnect nearby devices together, employing widely used networking protocols. The various aspects described herein can apply to any communication standard, such as Wi-Fi or, more generally, any member of the IEEE 802.11 family of wireless protocols.

In some aspects, wireless signals can be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol can be used for Internet access, sensors, metering, smart grid networks, or other wireless applications. Advantageously, aspects of certain devices implementing this particular wireless protocol can consume less power than devices implementing other wireless protocols, can be used to transmit wireless signals across short distances, and/or can be able to transmit signals less likely to be blocked by objects, such as humans.

In some implementations, a WLAN includes various devices which are the components that access the wireless network. For example, there can be two types of devices: access points ("APs") and clients (also referred to as stations, or "STAs"). In general, an AP serves as a hub or base station for the WLAN and an STA serves as a user of the WLAN. For example, a STA can be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area networks. In some implementations an STA can also be used as an AP.

The techniques described herein can be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, Multiple-In-Multiple-Out (MIMO) systems, and so forth. An SDMA system can utilize sufficiently different directions to concurrently transmit data belonging to multiple user terminals. A TDMA system can allow multiple user terminals to share the same frequency channel by dividing the transmission signal into different time slots, each time slot being assigned to different user terminal. A TDMA system can implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers can also be called tones, bins, etc. With OFDM, each sub-carrier can be independently modulated with data. An OFDM system can implement IEEE 802.11 or some other standards known in the art. An SC-FDMA system can utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system can implement 3GPP-LTE (3rd Generation Partnership Project Long Term Evolution) or other standards.

The teachings herein can be incorporated into (e.g., implemented within or performed by) a variety of wired or wireless apparatuses (e.g., nodes). In some aspects, a wireless node implemented in accordance with the teachings herein can comprise an access point or an access terminal.

An access point ("AP") can comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") can also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal can comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein can implement the 802.11ah standard, for example. Such devices, whether used as an STA or AP or other device, can be used for smart metering or in a smart grid network. Such devices can provide sensor applications or be used in home automation. The devices can instead or in addition be used in a healthcare context, for example for personal healthcare. They can also be used for surveillance, to enable extended-range Internet connectivity (e.g., for use with hotspots), or to implement machine-to-machine communications.

FIG. 1 illustrates an example of a wireless communication system 100 in which aspects of the present disclosure can be employed. The wireless communication system 100 can operate pursuant to a wireless standard, for example at least one of the 802.11ah, 802.11ac, 802.11n, 802.11g and 802.11b standards. The wireless communication system 100 can include an AP 104, which communicates with STAs 106.

A variety of processes and methods can be used for transmissions in the wireless communication system 100 between the AP 104 and the STAs 106. For example, signals can be transmitted and received between the AP 104 and the STAs 106 in accordance with OFDM/OFDMA techniques. If this is the case, the wireless communication system 100 can be referred to as an OFDM/OFDMA system. Alternatively, or additionally, signals can be transmitted and received between the AP 104 and the STAs 106 in accordance with CDMA techniques. If this is the case, the wireless communication system 100 can be referred to as a CDMA system. Alternatively, or additionally, signals can be sent and received between the AP 104 and the STAs 106 in accordance with MIMO techniques. If this is the case, the wireless communication system 100 can be referred to as a MIMO system. In various aspects, the wireless communication system 100 can simultaneously employ a combination of techniques such as, for example, OFDMA and MIMO.

A communication link that facilitates transmission from the AP 104 to one or more of the STAs 106 can be referred to as a downlink (DL) 108, and a communication link that facilitates transmission from one or more of the STAs 106 to the AP 104 can be referred to as an uplink (UL) 110. Alternatively, a downlink 108 can be referred to as a forward link or a forward channel, and an uplink 110 can be referred to as a reverse link or a reverse channel.

The AP 104 can provide wireless communication coverage in a basic service area (BSA) 102. The AP 104 along with the STAs 106 associated with the AP 104 and that use the AP 104 for communication can be referred to as a basic service set (BSS). It should be noted that the wireless communication system 100 might not have a central AP 104, but rather can function as a peer-to-peer network between the STAs 106. Accordingly, the functions of the AP 104 described herein can alternatively be performed by one or more of the STAs 106.

Figure 2:
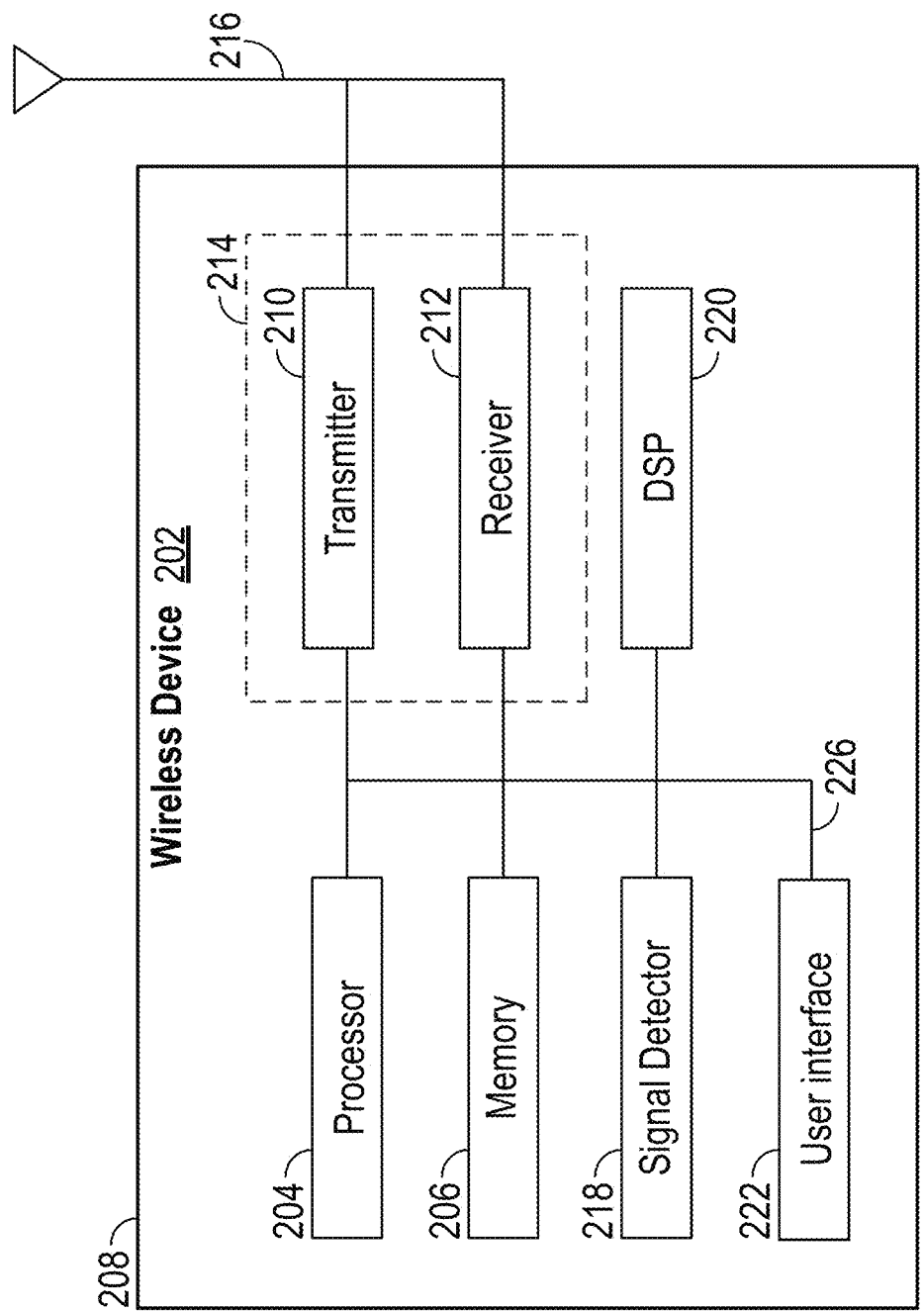
FIG. 2 illustrates various components that can be utilized in a wireless device that can be employed within the wireless communication system of FIG. 1.

FIG. 2 illustrates various components that can be utilized in a wireless device 202 that can be employed within the wireless communication system 100 of FIG. 1. The wireless device 202 is an example of a device that can be configured to implement the various methods described herein. For example, the wireless device 202 can comprise the AP 104 or one of the STAs 106.

The wireless device 202 can include a processor 204 which controls operation of the wireless device 202. The processor 204 can also be referred to as a central processing unit (CPU). Memory 206, which can include both read-only memory (ROM) and random access memory (RAM), provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas, which can be utilized during MIMO communications, for example.

In various embodiments a communications interface (or "interface") can include any of the transmitter 210, the receiver 212, and the transceiver 214. As used herein, the term interface may refer to hardware or software configured to connect two or more devices together. For example, an interface may be a part of a processor or a bus and may be configured to allow communication of information or data between the devices. The interface may be integrated into a chip or other device. For example, in some embodiments, an interface may comprise a receiver configured to receive information or communications from a device at another device. The interface (e.g., of a processor or a bus) may receive information or data processed by a front end or another device or may process information received. In some embodiments, an interface may comprise a transmitter configured to transmit or communicate information or data to another device. Thus, the interface may transmit information or data or may prepare information or data for outputting for transmission (e.g., via a bus).

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can comprise a physical layer data unit (PPDU). In some aspects, the PPDU is referred to as a packet.

The wireless device 202 can further comprise a user interface 222 in some aspects. The user interface 222 can comprise a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art will appreciate the components of the wireless device 202 can be coupled together or accept or provide inputs to each other using some other mechanism.

Although a number of separate components are illustrated in FIG. 2, those of skill in the art will recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

As discussed above, the wireless device 202 can comprise an AP 104 or an STA 106, and can be used to transmit and/or receive communications. The communications exchanged between devices in a wireless network can include data units which can comprise packets or frames. In some aspects, the data units can include data frames, control frames, and/or management frames. Data frames can be used for transmitting data from an AP and/or a STA to other APs and/or STAs. Control frames can be used together with data frames for performing various operations and for reliably delivering data (e.g., acknowledging receipt of data, polling of APs, area-clearing operations, channel acquisition, carrier-sensing maintenance functions, etc.). Management frames can be used for various supervisory functions (e.g., for joining and departing from wireless networks, etc.).

Certain aspects of the present disclosure support allowing APs 104 to schedule STAs 106 transmissions in optimized ways to improve efficiency. Both high efficiency wireless (HEW) stations, stations utilizing an 802.11 high efficiency protocol, and stations using older or legacy 802.11 protocols, can compete for access to a wireless medium. The high-efficiency 802.11 protocol described herein can allow for devices to operate under a modified mechanism that differentiates between devices that can communicate concurrently and devices that cannot communicate concurrently. Accordingly, in the case of apartment buildings or densely-populated public spaces, APs and/or STAs that use the high-efficiency 802.11 protocol can experience reduced latency and increased network throughput even as the number of active wireless devices increases, thereby improving user experience.

Certain aspects of the present disclosure support allowing APs and STAs to request deferral of certain subsets of nodes using an RTS (alternatively referred to as an RTX) and/or CTS (alternatively referred to as a CTX) in optimized ways to improve efficiency. Generally, wireless networks that use a regular 802.11 protocol (e.g., 802.11a, 802.11b, 802.11ac, 802.11g, 802.11n, etc.) operate under a carrier sense multiple access (CSMA) mechanism for medium access. According to CSMA, devices sense the medium and only transmit when the medium is sensed to be idle. The use of the CSMA mechanism can create inefficiencies because some APs or STAs located inside or outside of a base service area (BSA) can be able to transmit data without interfering with a transmission made by an AP or STA in the BSA. As the number of active wireless devices continues to grow, the inefficiencies can begin to significantly affect network latency and throughput. The RTS/CTS exchange protocol described herein can allow for devices to operate under a modified mechanism that differentiates between devices that can communicate concurrently with the devices that are exchanging the RTS and CTS frames and devices that cannot communicate concurrently. Accordingly, in the case of apartment buildings or densely-populated public spaces, APs and/or STAs that use the modified RTS/CTS protocol discussed herein can experience reduced latency and increased network throughput even as the number of active wireless devices increases, thereby improving user experience.

Figure 3:
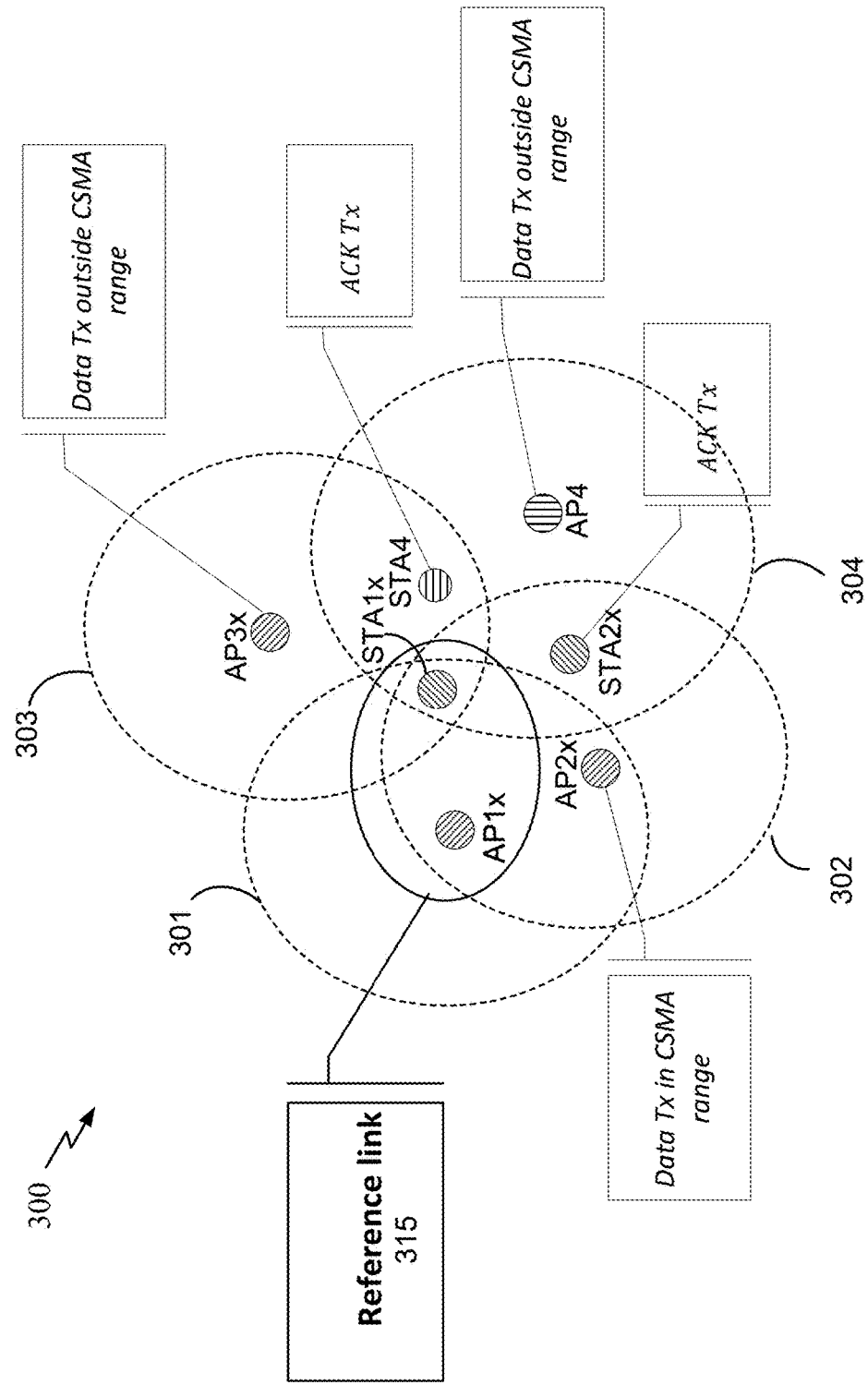
FIG. 3 is a diagram of an exemplary wireless communication system.

FIG. 3 is a diagram of an exemplary wireless communication system 300 for a channel x. In the illustrated aspect, the wireless communication system 300 includes a plurality of APs (e.g., AP1x, AP2x, AP3x, and AP4), each having a BSA 301-304, and STAs (e.g., STA1x, STA2x, and STA4). In some aspects the various operations of APs and STAs described herein can be interchanged. For each AP-STA link (e.g., reference link 315) working on channel x, the number of bytes successfully received can be expressed in the following way:

$$f\left(\sum_{\substack{ch\,x\,in\\CSMA\,range}} Data\ Tx + \sum_{\substack{ch\,x\,outside\\CSMA\,range}} Data\ Tx + \right.$$

$$\left. \sum_{ch\,x} ACK\ Tx + \sum_{ch\neq x} Data\ Tx + \sum_{ch\neq x} ACK\ Tx \right)$$

An RTS/CTS exchange can alter the total number of bytes received by effectively reducing the data transmissions (TX) on the channel x outside the CSMA range and the acknowledgement (ACK) transmissions on channel x to zero. Nodes that send data transmissions (TX) on the channel x outside the CSMA range and nodes that send acknowledgement (ACK) transmissions on channel x can be considered "jammers" that can cause interference with a given reference link 315 on channel x. Given that RTS/CTS messages silence the nodes receiving the messages, usage of RTS/CTS can decrease system throughput. However, the RTS/CTS exchange can reduce interference and improve reception for a given STA when there are many devices present that can cause interference.

Figure 4:
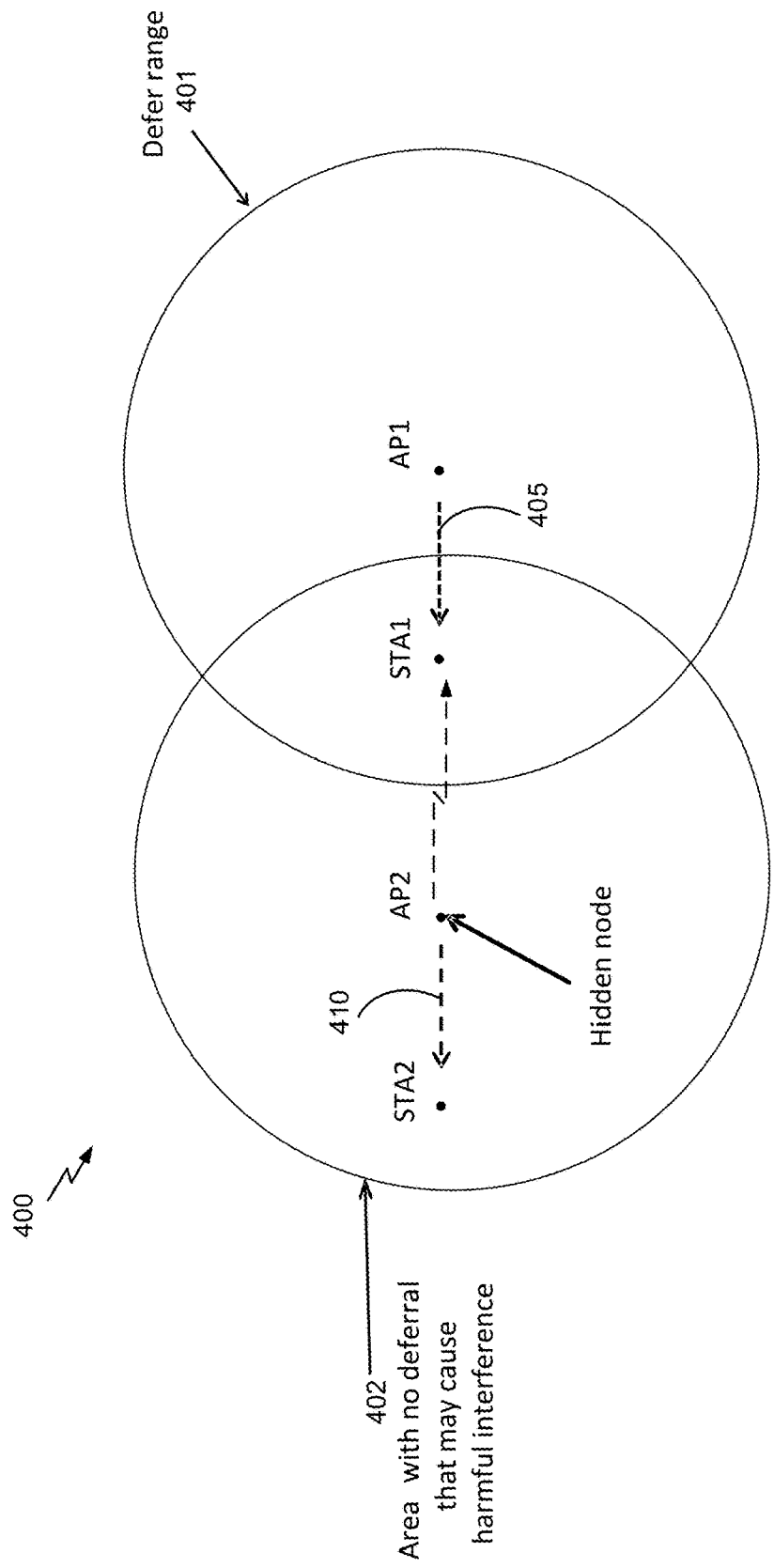
FIG. 4 is a diagram of an exemplary wireless frame exchange, according to one aspect.

FIG. 4 is a diagram of an exemplary wireless frame exchange 400, according to one aspect. In conjunction with FIG. 1, in some aspects, an AP 104 can transmit a RTS frame to a STA 106 and the STA 106 can respond to the RTS frame by sending a CTS frame to the AP 104. An RTS/CTS exchange can be desirable for hidden node mitigation or for clearing the medium when data transmission is not successful for STAs 106. As shown in FIG. 4, the AP1 can transmit an RTS 405 or other message to STA1 with the RTS 405 deferring all STAs and APs within the defer range 401. AP2 is outside the defer range 401, and can be considered a hidden node with respect to the AP1. As shown in FIG. 4, the AP2 can transmit a message 410 to STA2 within its own defer range 402 which can interfere with STA1's reception of the RTS 405 or with its transmission of a responsive CTS frame.

While FIG. 4 shows a downlink (DL) configuration, an uplink (UL) configuration can be reversed. For example, the STA1 can optionally transmit an RTX to the AP1 to initiate an UL PPDU. The AP1 can transmit a CTX to initiate UL transmission from the STA1, potentially concurrently with one or more other multiuser (MU) STAs. After UL transmission, the AP1 can transmit an acknowledgement (ACK), or block ACK (BA). Thus, the hidden node AP2 can interfere with the reception of the ACK at the STA1.

Figure 5:
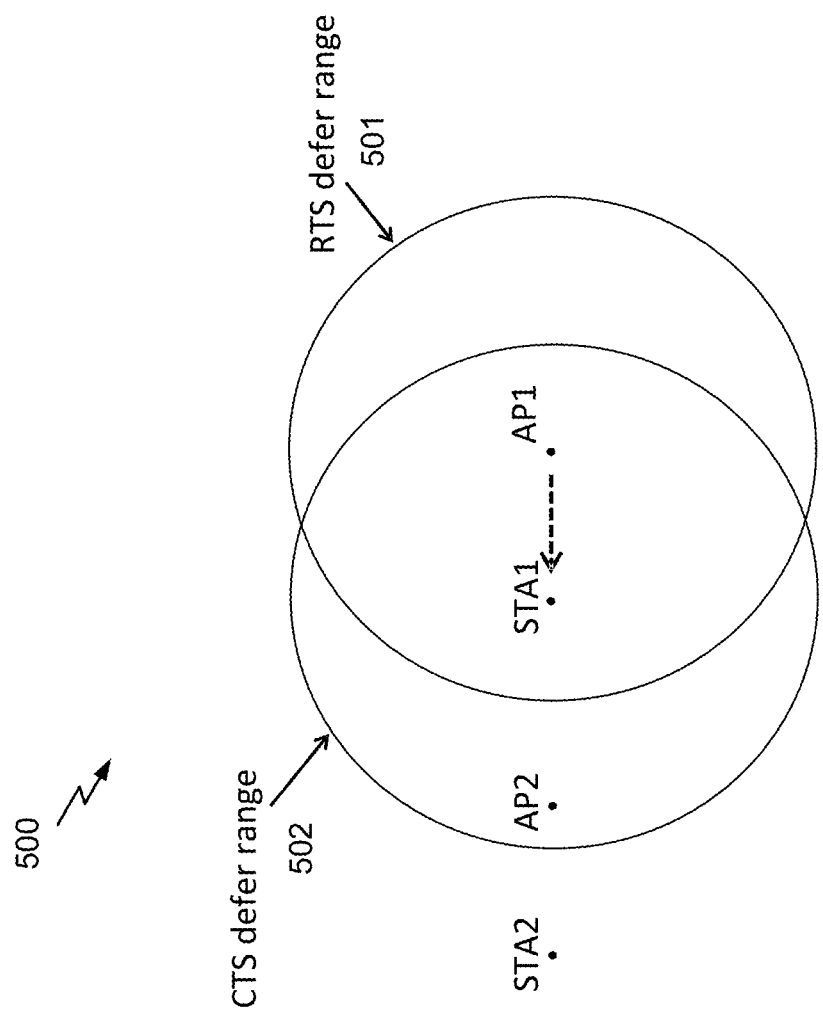
FIG. 5 is a diagram of an exemplary wireless frame exchange, according to another aspect.
Figure 6:
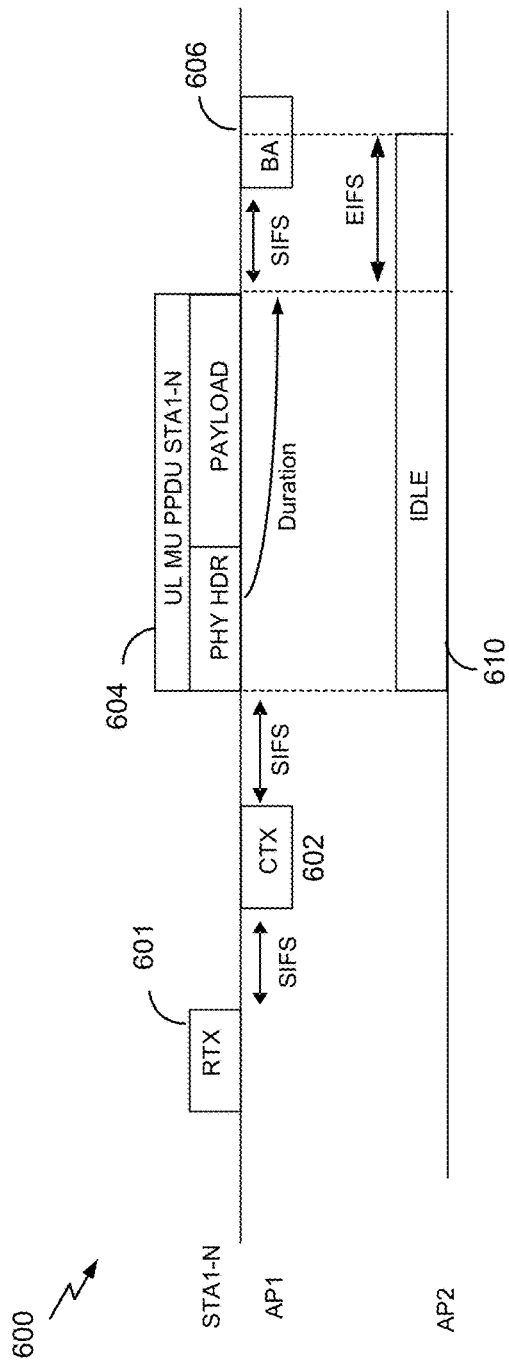
FIG. 6 is a time sequence diagram of the wireless frame exchange of FIG. 5.

FIGS. 5 and 6 illustrate the effects of the RTX/CTX system. FIG. 5 is a diagram 500 of an exemplary wireless frame exchange, according to another aspect. FIG. 6 is a time sequence diagram 600 of the wireless frame exchange of FIG. 5. In FIGS. 5 and 6, one or more MU STAs STA1-N transmit to AP1 a RTX frame 601 with a defer range 501. In various aspects, the RTX frame 601 is optional. AP1 then responds with a CTX frame 602 with a defer range 502. The STAs STA1-N transmit UL MU PPDUs 604 to the AP1. The AP2 (hidden node) can decode a duration in a legacy PHY header of the UL MU PPDUs 604. The duration can indicate a time at which a payload of the UL MU PPDU 604 will finish. The AP2 can defer and/or remain idle for the period 610, which can last for the indicated duration, plus an extended interframe space (EIFS). In various single-user aspects, the period 610 can be sufficient for the AP1 to transmit an ACK. On the other hand, in the illustrated multi-user aspect, the period 610 is not sufficient for the AP1 to transmit the BA 606. Thus, the AP2 can cause interference while the STAs STA1-N are receiving the BA 606.

In various aspects, the potential interference discussed above with respect to FIG. 6 can be avoided by setting the duration indication in the PHY header of the UL MU PPDU 604 to be longer than the actual duration of the payload. Although this disclosure generally refers to "durations," the phrase is contemplated to further include lengths, sizes, start and end times (explicit or implicit), and transmission times, or payloads, packets, and/or portions of packets. Similarly, although this disclosure generally refers to "actual" durations and the like, the phrase is contemplated to further include expected durations, instructed durations, anticipated durations, durations "to be," and can more generally be referred to as a time associated with transmission.

In various aspects, the duration indication can be referred to as a packet transmission time indicator. When the duration indication does not accurately indicate a length or end of the PPDU 604, it can be variously referred to as a spoofed duration, spoofed packet transmission time indicator, adjusted duration, adjusted packet transmission time indicator, modified duration, modified packet transmission time indicator, lengthened duration, lengthened packet transmission time indicator, inaccurate duration, inaccurate packet transmission time indicator, lengthened packet transmission time indicator, non-compliant (for example, with respect to a legacy standard) duration, non-compliant packet transmission time indicator etc. In some aspects, the duration indication can be non-compliant only with respect to a legacy preamble standard. The PPDU 604 can include one or more alternative duration indications (for example, in a HE preamble), which can accurately indicate a duration of the PPDU 604. In some aspects, the HE preamble can include no accurate indication of the duration of the PPDU 604.

Figure 7:
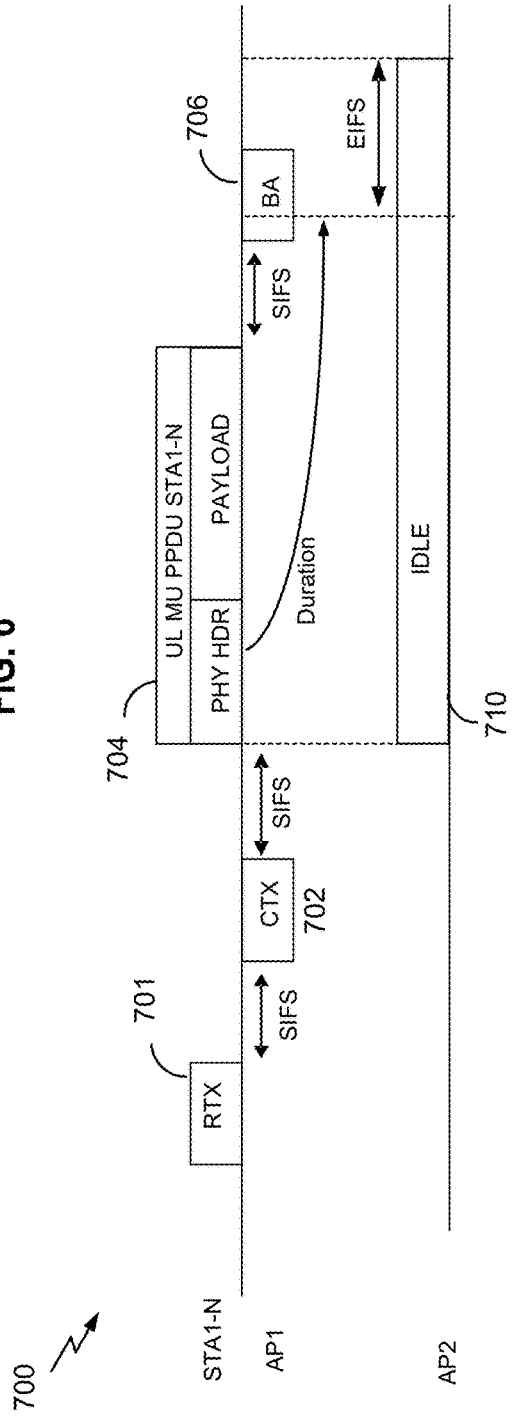
FIG. 7 is a time sequence diagram of the wireless frame exchange of FIG. 6, according to another aspect.

FIG. 7 is a time sequence diagram 700 of the wireless frame exchange of FIG. 6, according to another aspect. In FIG. 7, one or more MU STAs STA1-N transmit to AP1 a RTX frame 701 with a defer range 501. In various aspects, the RTX frame 701 is optional. AP1 then responds with a CTX 702 frame with a defer range 502. In various aspects, the CTX 702 frame can include an indication of how long UL MU PPDUs 704 should be. For example, the CTX 702 frame can include an instruction specifying an expected duration for the UL MU PPDUs 704. In various aspects, the duration instruction can be referred to as a duration indication, a packet transmission time instructions, a packet transmission time indicator, a maximum packet transmission time instructions, a maximum packet transmission time indicator, and so on. In various aspects, the duration instruction can indicate an additional amount of time, beyond an actual or expected transmission time of the PPDU 704, which the STAs STA1-N should indicate in its spoofed duration indication.

In various aspects, the additional amount of time can be specified based on a multiple of an EIFS such as, for example, two times the EIFS. In various aspects, the duration instruction can specify a duration and/or length of the UL MU PPDUs 704 using a combination of number of symbols and a symbol rate. In other aspects, the duration instruction can specify a duration and/or length of the UL MU PPDUs 704 using a number or fraction of seconds or time units (TUs).

In response to the CTX 702 frame, the STAs STA1-N transmit UL MU PPDUs 704 to the AP1. The STAs STA1-N can set a length of the PPDU 704 to be equal to, or equal to or less than, the duration instruction in the CTX 702 frame. Unlike the aspect discussed above with respect to FIG. 6, the legacy PHY header of the PPDU 704 can include an inaccurate duration indication, which indicates that the PPDU 704 will terminate later than it actually will (or is expected to). For example, the duration indication can indicate that the payload of the UL MU PPDU 704 will finish at a time sufficient to cause the AP2 to defer until after the BA 706 is received. The AP2 (hidden node) can decode the duration in a legacy PHY header of the UL MU PPDUs 704. Thus, the AP2 can defer and/or remain idle for the period 710, which can last for the indicated duration, plus an extended interframe space (EIFS). Accordingly, the AP2 does not cause interference while the STAs STA1-N are receiving the BA 706.

Figure 8:
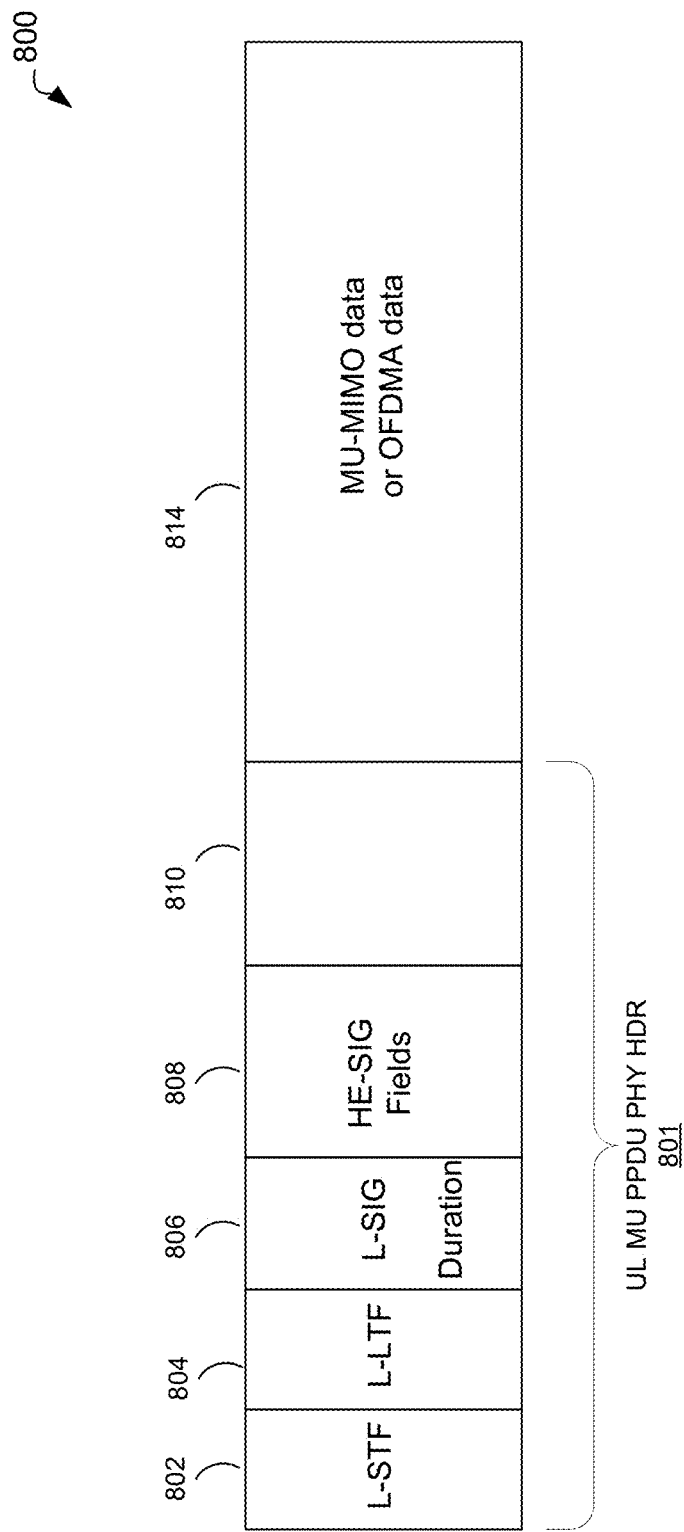
FIG. 8 is a diagram of an aspect of a physical layer data unit (PPDU) packet format including OFDMA or MU-MIMO portions.

FIG. 8 is a diagram of an aspect of a physical layer data unit (PPDU) 800 packet format including OFDMA or MU- MIMO portions. The PPDU 800 can be transmitted by a wireless device, such as the STA1 discussed above with respect to FIGS. 1-7. In an aspect, the PPDU 800 can include the UL MU PPDU 704 discussed above with respect to FIG. 7. The PPDU 800 can comprise a legacy portion (for example, PHY header 801), which includes legacy fields: legacy short training field (L-STF) 802; legacy long training field (L-LTF) 804; and legacy signal field (L-SIG) 806. As features have been added to IEEE 802.11, changes to the format of the SIG fields in data packets were developed to provide additional information to STAs. FIG. 8 shows the packet structure for an exemplary IEEE 802.11ax packet. To provide backward compatibility for systems containing both IEEE 802.11a/b/g (etc.) devices and IEEE 802.11ax devices, the data packet for IEEE 802.11ax systems also includes the STF, LTF, and SIG fields of these earlier systems, noted as L-STF 802, L-LTF 804, and L-SIG 806 with a prefix L to denote that they are "legacy" fields. When a legacy device configured to operate with IEEE 802.11a/b/g receives such a packet, it can receive and decode the L-SIG field 806 as a normal 11/b/g packet. However, as the device continues decoding additional bits, they might not be decoded successfully because the format of the data packet after the L-SIG field 806 is different from the format of an 11/b/g packet, and the CRC check performed by the device during this process can fail. This causes these legacy devices to stop processing the packet, but still defer any further operations until a time period has passed defined by the length field in the initially decoded L-SIG. In contrast, new devices compatible with IEEE 802.11n can sense the modulation in subsequent high-efficiency signal fields (HE-SIG) 808, which contain certain signaling information for the PPDU 800, and process the packet as an 802.11ax packet. The PPDU 800 can also include one or more short training fields (STFs) and long training fields (LTFs), and a MU-MIMO or OFDMA data payload 814.

The PHY header 801 can include the spoofed duration indication discussed above with respect to FIG. 7. The spoofed duration indication can be included in the L-SIG field 806. In some aspects, the HE-SIG fields 808 can include an accurate duration indication, which in some aspects is only decodable by non-legacy devices. In some aspects, the HE-SIG fields 808 can include no duration indication, and listening devices can implicitly determine a length of the PPDU 800, for example, based on a duration indication in the CTX 702 (FIG. 7).

Figure 9:
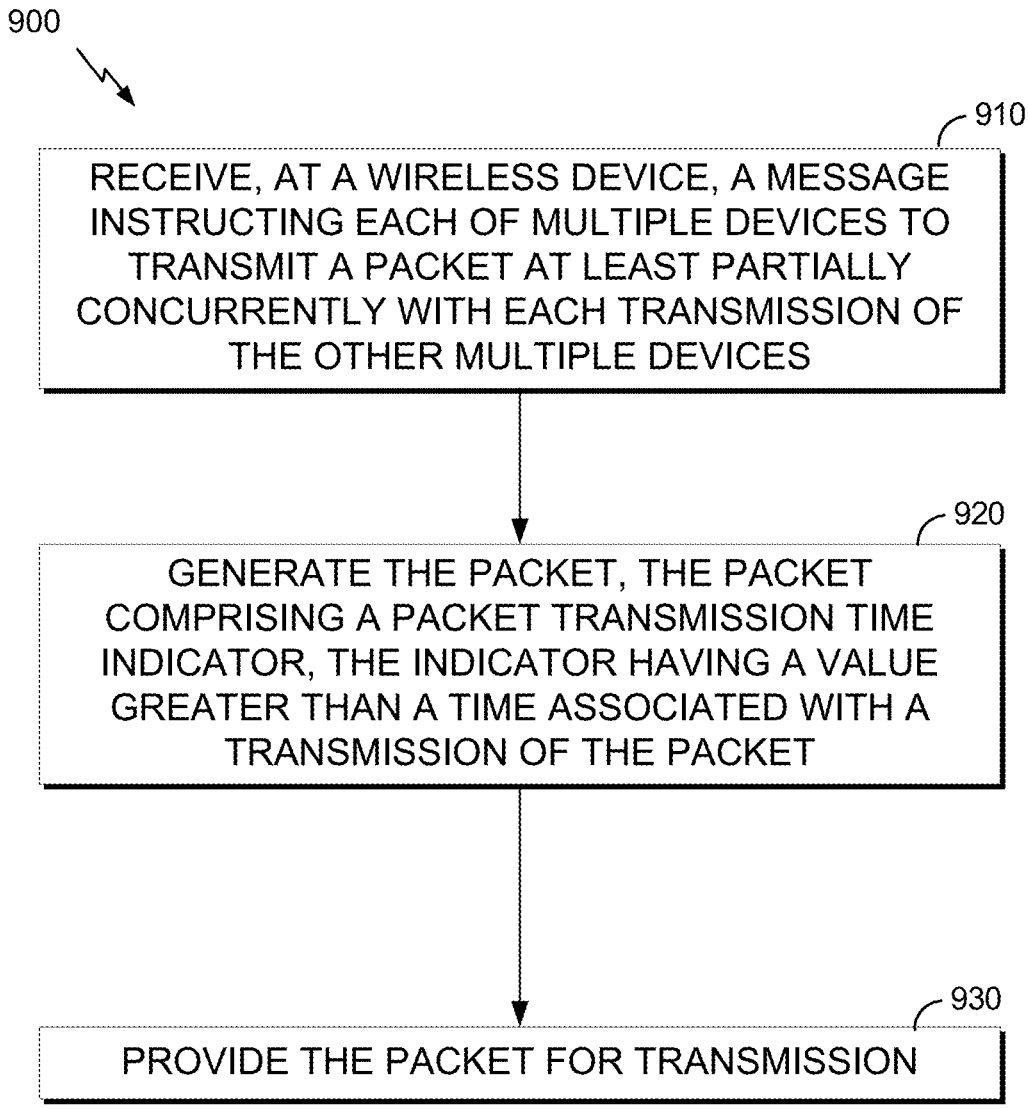
FIG. 9 shows a flowchart for an exemplary method of wireless communication that can be employed within the wireless communication system of FIG. 1.

FIG. 9 shows a flowchart 900 for an exemplary method of wireless communication that can be employed within the wireless communication system 100 of FIG. 1. The method can be implemented in whole or in part by the devices described herein, such as the wireless device 202 shown in FIG. 2. Although the illustrated method is described herein with reference to the wireless communication system 100 discussed above with respect to FIG. 1, the wireless device 202 discussed above with respect to FIG. 2, the wireless communication system 300 discussed above with respect to FIG. 3, the wireless frame exchange 400 discussed above with respect to FIG. 4, and the timing diagram 500 discussed above with respect to FIG. 5, a person having ordinary skill in the art will appreciate that the illustrated method can be implemented by another device described herein, or any other suitable device. Although the illustrated method is described herein with reference to a particular order, in various aspects, blocks herein can be performed in a different order, or omitted, and additional blocks can be added.

First, at block 910, a wireless device receives a message instructing each of multiple devices to transmit a packet at least partially concurrently with each transmission of the other multiple devices. For example, referring back to FIG. 7, the STA1 can receive the CTX 702 from the AP1, which can instruct each of multiple STAs STA1-STAN to concurrently transmit an UL MU PPDU 704 to the AP1.

In various aspects, the message instructing each of the multiple devices to transmit the packet includes a clear-to-send frame comprising an identifier of the wireless device. For example, the message instructing each of the multiple devices to transmit the packet can include the CTX 702, which can include an identifier (such as an AID or partial AID) of the STA1. The STA1 can identify its identifier and determine that it has been scheduled to transmit an UL MU PPDU 704.

Next, at block 920, the wireless device generates the packet. The packet includes an indicator having a value greater than a time associated with a transmission of the packet. In various aspects, the time associated with the transmission of the packet can be a time duration of the packet. For example, the time associated with the transmission of the packet can be the exact time duration of the PPDU 704.

Then, at block 930, the wireless device provides the packet for transmission. For example, the STA1 can provide the UL MU PPDU 704 for transmission to the AP1, for example by the transmitter 210 (FIG. 2). The UL MU PPDU 704 can include the spoofed duration indication discussed above with respect to FIGS. 7-8, for example, in the L-SIG field 806 of the PHY header 801. As shown in FIG. 7, the spoofed duration indication can indicate a packet transmission time of the PPDU 704 greater than a time associated with transmission of the PPDU 704 (compare, for example, to FIG. 6).

In various aspects, the wireless device receives an acknowledgement regarding reception of the packet during a time indicated in the indicator. The indicator has a value greater than the time associated with the transmission of the packet by at least a transmission time of the acknowledgement. For example, the STA1 can receive the BA 706 from the AP1 during the duration shown in FIG. 7. The duration can be longer than an actual transmission time of the PPDU 704 by at least a transmission time of the BA 706. In various aspects, the duration can be longer than an actual transmission time of the PPDU 704 by at least the BA 706, plus a SIFS, minus an EIFS. In other words, the duration can be longer than an actual transmission time of the PPDU 704 sufficient to cause the AP2 to defer or idle at least long enough for the STA1 to receive the BA 706 without interference. In various aspects, the duration can be longer than an actual transmission time of the PPDU 704 by at least the BA 706, plus an EIFS.

In various aspects, the message instructing each of the multiple devices to transmit the packet includes an indication of a time period. The value of the indicator can be based on the indication of the time period. For example, the CTX 702 can include an indication of one or more of: a transmission time of the PPDU 704, a deferral or idle time for the STA1 to indicate to the AP2, or a difference between the two. In various aspects, the AP1 can indicate a different time period to each of the STAs STA1-N. In various aspects, the time period can be the time period for an ACK (which can also be different for each of the STAs STA1-N).

In various aspects, the STA1 can determine the time period to be a predefined or static value, for example retrieved from memory or hard-coded. In various aspects, the STA1 can determine the time period independent from the AP1 and the CTX 702. In various aspects, the AP1 can indicate the time period via a network allocation vector (NAV). In various aspects, the AP1 can indicate the time period in a separate dedicated communication.

In various aspects, the message instructing each of the multiple devices to transmit the packet includes a packet transmission time instruction, and the wireless device sets the actual transmission time of the packet equal to the packet transmission time instruction. For example, CTX 702 can include an instruction to the STA1 that the UL MU PPDU 704 should be a specific length. The instruction can indicate, for example, a transmission time, or a combination of number of symbols and symbol rate. The STA1 can transmit the UL MU PPDU 704 such that the transmission time is equal to, or substantially equal to, the packet transmission time instruction. For example, substantially equal transmission time can include transmission times within a timing tolerance of a transmitter or receiver.

In various aspects, the packet can include a multiple-in-multiple-out frame or an orthogonal frequency division multiple access frame. For example, the UL MU PPDU 704 can include a MIMO frame. The UL MU PPDU 704 can include an OFDMA frame. In various aspects, the UL MU PPDU 704 can include any multi-user technology.

In various aspects, the packet includes a single-user portion comprising the indicator. For example, the UL MU PPDU 704 can include the legacy fields 802, 804, and 806 discussed above with respect to FIG. 8. In various aspects, the single-user portion is compatible with an 802.11a or 802.11b preamble format.

In various aspects, the packet includes a multi-user portion without an indication of packet transmission time. For example, the UL MU PPDU 704 can include the HE fields 808 and 810 discussed above with respect to FIG. 8. Where HE fields 808 and 810 might include a separate duration indication in some aspects, in at least one aspect, they include no indication of packet duration. In various aspects, the AP1 can implicitly determine a duration of the PPDU 704, for example based on the duration instruction provided in the CTX 702.

In various aspects, the packet can include a portion identical to a packet transmitted by one of the multiple devices. The portion can include the indicator. For example, the UL MU PPDU 704 can include legacy fields 802, 804, and 806 discussed above with respect to FIG. 8. In various aspects, each of the STAs STA1-N can transmit a different PPDU 704, each PPDU 704 having a common duration field, for example in the L-SIG 806.

Figure 10:
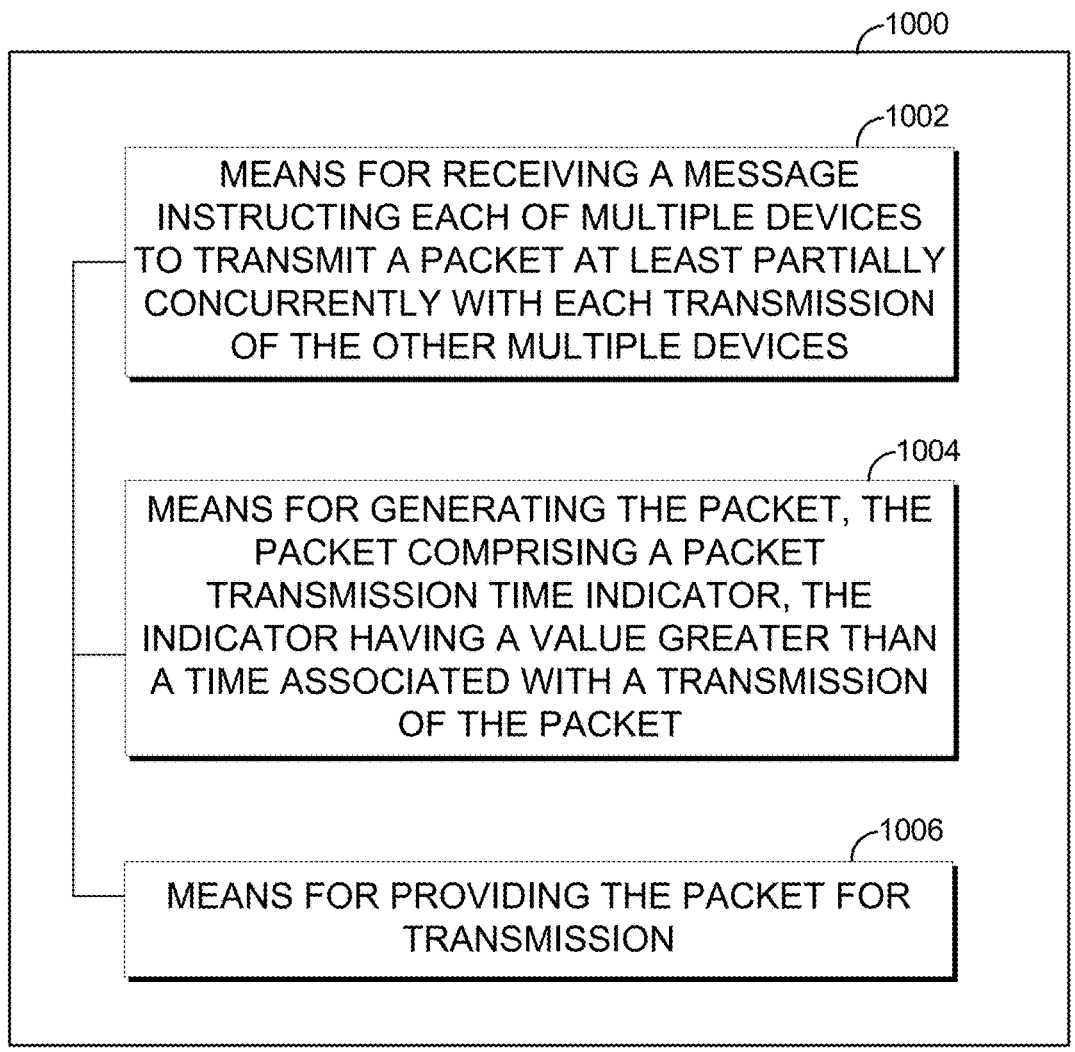
FIG. 10 is a functional block diagram of an apparatus for wireless communication.

FIG. 10 is a functional block diagram of an apparatus 1000 for wireless communication. Those skilled in the art will appreciate that an apparatus for detecting wireless communication can have more components than the simplified apparatus 1000 shown in FIG. 10. The apparatus 1000 for wireless communication shown includes only those components useful for describing some prominent features of implementations within the scope of the claims. The apparatus 1000 for wireless communication includes means 1002 for receiving a message instructing each of multiple devices to transmit a packet at least partially concurrently with each transmission of the other multiple devices, means 1004 for generating the packet, and means 1006 for providing the packet for transmission. In various aspects, the apparatus 1000 can further include means for performing any other block or function described herein.

In an aspect, means 1002 for receiving a message instructing each of multiple devices to transmit a packet at least partially concurrently with each transmission of the other multiple devices can be configured to perform one or more of the functions described above with respect to block 910 (FIG. 9). In various aspects, means 1002 can be implemented by one or more of the processor 204 (FIG. 2), the memory 206 (FIG. 2), the signal detector 218 (FIG. 2), the DSP 220 (FIG. 2), the receiver 212 (FIG. 2), the transceiver 214 (FIG. 2), and/or the antenna 216 (FIG. 2).

In an aspect, means 1004 for generating the packet can be configured to perform one or more of the functions described above with respect to block 920 (FIG. 9). In various aspects, means 1004 can be implemented by one or more of the processor 204 (FIG. 2), the memory 206 (FIG. 2), and the DSP 220 (FIG. 2).

In an aspect, means 1006 for providing the packet for transmission can be configured to perform one or more of the functions described above with respect to block 930 (FIG. 9). In various aspects, means 1006 can be implemented by one or more of the processor 204 (FIG. 2), the memory 206 (FIG. 2), the DSP 220 (FIG. 2), the transmitter 210 (FIG. 2), the transceiver 214 (FIG. 2), and/or the antenna 216 (FIG. 2).

In an aspect, the apparatus can further include means for receiving an acknowledgement regarding reception of the packet during a time indicated in the indicator, the value being greater than the time associated with the transmission of the packet by at least a transmission time of the acknowledgement. In various aspects, means for receiving the acknowledgement can be implemented by one or more of the processor 204 (FIG. 2), the memory 206 (FIG. 2), the signal detector 218 (FIG. 2), the DSP 220 (FIG. 2), the receiver 212 (FIG. 2), the transceiver 214 (FIG. 2), and/or the antenna 216 (FIG. 2).

In an aspect, the apparatus can further include means for providing the packet for transmission during a time duration indicated by the packet transmission time instruction. In various aspects, means for providing the packet can be implemented by one or more of the processor 204 (FIG. 2), the memory 206 (FIG. 2), the DSP 220 (FIG. 2), the transmitter 210 (FIG. 2), the transceiver 214 (FIG. 2), and/or the antenna 216 (FIG. 2).

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

As used herein, a phrase referring to "at least one of" a list of items refers to any combination of those items, including single members. As an example, "at least one of: a, b, or c" is intended to cover: a, b, c, a-a, b-b, c-c. a-b, a-c, b-c, and a-b-c.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can comprise non-transitory computer readable medium (e.g., tangible media). In addition, in some aspects computer readable medium can comprise transitory computer readable medium (e.g., a signal). Combinations of the above should also be included within the scope of computer-readable media. The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. An apparatus for wireless communication, comprising:
a processing system configured to:
receive a message instructing each of multiple devices to transmit a packet at least partially concurrently with each transmission of the other multiple devices, the message comprising an indication of a time period associated with transmission of an acknowledgment regarding reception of the packet, the acknowledgment being a block acknowledgment; and
generate the packet comprising an indicator having a value greater than a time associated with a transmission of the packet, the value being based on the indication of the time period; and
an interface configured to provide the packet for transmission during the time associated with the transmission of the packet,
wherein the message instructing each of the multiple devices to transmit the packet comprises a packet transmission time instruction, and wherein a duration indicated by the packet transmission time instruction is greater than the time associated with the transmission of the packet by at least the time period associated with transmission of the block acknowledgment and a time period associated with an extended interframe space (EIFS).

2. The apparatus of claim 1, wherein the time associated with the transmission of the packet comprises a time duration of the packet.

3. The apparatus of claim 1, wherein the processing system is configured to receive the acknowledgment regarding reception of the packet during a time duration indicated by the value of the indicator, the value being greater than the time associated with the transmission of the packet by at least a transmission time of the acknowledgment.

4. The apparatus of claim 1, wherein the message instructing each of the multiple devices to transmit the packet comprises a clear-to-send frame comprising an identifier of the apparatus.

5. The apparatus of claim 1, wherein the interface is configured to provide the packet for transmission during the duration indicated by the packet transmission time instruction.

6. The apparatus of claim 1, wherein the packet comprises a multiple-in-multiple-out frame or an orthogonal frequency division multiple access frame.

7. The apparatus of claim 1, wherein the packet comprises a single-user portion comprising the indicator, wherein the single-user portion is compatible with an 802.11a or 802.11b preamble format.

8. The apparatus of claim 1, wherein the packet comprises a multi-user portion without an indication of packet transmission time.

9. The apparatus of claim 1, wherein the packet comprises a portion identical to a packet transmitted by one of the multiple devices, the portion comprising the indicator.

10. A method of wireless communication, comprising:
receiving, at a wireless device, a message instructing each of multiple devices to transmit a packet at least partially concurrently with each transmission of the other multiple devices, the message comprising an indication of a time period associated with transmission of an acknowledgment regarding reception of the packet, the acknowledgment being a block acknowledgment;
generating the packet comprising an indicator having a value greater than a time associated with a transmission of the packet, the value being based on the indication of the time period; and
providing the packet for transmission during the time associated with the transmission of the packet,
wherein the message instructing each of the multiple devices to transmit the packet comprises a packet transmission time instruction, and wherein a duration indicated by the packet transmission time instruction is greater than the time associated with the transmission of the packet by at least the time period associated with transmission of the block acknowledgment and a time period associated with an extended interframe space (EIFS).

11. The method of claim 10, wherein the time associated with the transmission of the packet comprises a time duration of the packet.

12. The method of claim 10, further comprising receiving the acknowledgment regarding reception of the packet during a time duration indicated by the value of the indicator, the value being greater than the time associated with the transmission of the packet by at least a transmission time of the acknowledgment.

13. The method of claim 10, wherein the message instructing each of the multiple devices to transmit the packet comprises a clear-to-send frame comprising an identifier of the wireless device.

14. The method of claim 10, further comprising providing the packet for transmission during the duration indicated by the packet transmission time instruction.

15. The method of claim 10, wherein the packet comprises a multiple-in-multiple-out frame or an orthogonal frequency division multiple access frame.

16. The method of claim 10, wherein the packet comprises a single-user portion comprising the indicator, wherein the single-user portion is compatible with an 802.11a or 802.11b preamble format.

17. The method of claim 10, wherein the packet comprises a multi-user portion without an indication of packet transmission time.

18. The method of claim 10, wherein the packet comprises a portion identical to a packet transmitted by one of the multiple devices, the portion comprising the indicator.

19. A wireless node for wireless communication, comprising:
an antenna;
a processing system configured to:
receive a message instructing each of multiple devices to transmit a packet at least partially concurrently with each transmission of the other multiple devices, the message comprising an indication of a time period associated with transmission of an acknowledgment regarding reception of the packet, the acknowledgment being a block acknowledgment; and
generate the packet comprising an indicator having a value greater than a time associated with a transmission of the packet, the value being based on the indication of the time period; and
an interface configured to provide the packet for transmission via the antenna during the time associated with the transmission of the packet,
wherein the message instructing each of the multiple devices to transmit the packet comprises a packet transmission time instruction, and wherein a duration indicated by the packet transmission time instruction is greater than the time associated with the transmission of the packet by at least the time period associated with transmission of the block acknowledgment and a time period associated with an extended interframe space (EIFS).

20. An apparatus for wireless communication, comprising:
means for receiving, at the apparatus, a message instructing each of multiple devices to transmit a packet at least partially concurrently with each transmission of the other multiple devices, the message comprising an indication of a time period associated with transmission of an acknowledgment regarding reception of the packet, the acknowledgment being a block acknowledgment;
means for generating the packet comprising an indicator having a value greater than a time associated with a transmission of the packet, the value being based on the indication of the time period; and
means for providing the packet for transmission during the time associated with the transmission of the packet,
wherein the message instructing each of the multiple devices to transmit the packet comprises a packet transmission time instruction, and wherein a duration indicated by the packet transmission time instruction is greater than the time associated with the transmission of the packet by at least the time period associated with transmission of the block acknowledgment and a time period associated with an extended interframe space (EIFS).

21. The apparatus of claim 20, wherein the time associated with the transmission of the packet comprises a time duration of the packet.

22. The apparatus of claim 20, further comprising means for receiving the acknowledgment regarding reception of the packet during a time duration indicated by the value of the indicator, the value being greater than the time associated with the transmission of the packet by at least a transmission time of the acknowledgment.

23. The apparatus of claim 20, wherein the message instructing each of the multiple devices to transmit the packet comprises a clear-to-send frame comprising an identifier of the apparatus.

24. The apparatus of claim 20, the apparatus further comprising means for providing the packet for transmission during the duration indicated by the packet transmission time instruction.

\* \* \* \* \*